(12) United States Patent
Jankov et al.

(10) Patent No.: US 7,685,039 B1
(45) Date of Patent: Mar. 23, 2010

(54) COST-BASED TECHNOLOGY AND MANUFACTURING EXCHANGE

(75) Inventors: Ronald S. Jankov, Mountain View, CA (US); Niall Bartlett, St. Thomas, VI (US)

(73) Assignee: NetLogic Microsystems, Inc., Mountain View, CA (US)

( * ) Notice: Subject to any disclaimer, the term of this patent is extended or adjusted under 35 U.S.C. 154(b) by 1708 days.

(21) Appl. No.: 10/810,176

(22) Filed: Mar. 26, 2004

(51) Int. Cl.
*G06Q 40/00* (2006.01)
(52) U.S. Cl. ...................................................... 705/35
(58) Field of Classification Search .................. 705/35
See application file for complete search history.

(56) References Cited

U.S. PATENT DOCUMENTS

2004/0098142 A1* 5/2004 Warren et al. ................. 700/22
2004/0158473 A1* 8/2004 Contractor ..................... 705/1

OTHER PUBLICATIONS

F M Scherer; Jayashree Watal; "Post-trips options for access to patented medicines in developing nations," Journal of International Economic Law, Dec. 2002, vol. 5, Iss. 4, p. 913.*
Ron Idra; James L. Rogers; "Profit from Intellectual Property," 2003, Sphinx Publishing, pp. 93-96.*
Business Wire, New York, "Forgent Announces the Results for the 2002 Fiscal Fourth Quarter and Fiscan Year End," Sep. 18, 2002, p. 1.*

* cited by examiner

*Primary Examiner*—Charles R Kyle
*Assistant Examiner*—David L Wood
(74) *Attorney, Agent, or Firm*—Mahamedi Paradice Kreisman LLP; William L. Paradice, III

(57) ABSTRACT

Cost-based methods of exchanging/transferring intellectual property (IP) among parties are provided that include royalty rates and mark-up rates based on a common factor. The common factor of an embodiment includes the cost of a component material of a product. The IP includes at least one of technology, patents, and trade secrets. The methods include a first company that transfers IP to a second company. The first and second companies, in effecting the transfer, establish a royalty rate that is a first percentage of a cost of a component material of the products and a mark-up rate that is a second percentage of the cost of the component material.

31 Claims, 5 Drawing Sheets

Mark-up Rate = 40%
Royalty Rate = 37%

300

| Product Split<br>Mfr / Des | MFR Net<br>Product Cost ($) | Des Net<br>Product Cost ($) |
|---|---|---|
| 90/10 | 130 | -167 |
| 80/20 | 124 | 4 |
| 70/30 | 117 | 61 |
| 60/40 | 107 | 89 |
| Target 54/46 | 100 | 100 |
| 50/50 | 94 | 106 |
| 40/60 | 74 | 117 |
| 30/70 | 41 | 125 |
| 20/80 | -26 | 131 |
| 10/90 | -226 | 136 |

302 groups rows 90/10 through 60/40. 304 groups rows 50/50 through 10/90.

COST-BASED TECHNOLOGY AND MANUFACTURING EXCHANGE

TECHNICAL FIELD

The disclosed embodiments relate to business methods for transferring and licensing intellectual property (IP).

BACKGROUND

A company's ability to be successful in today's competitive business environment depends, in large part, on its capacity to acquire and maintain technology and to competitively and consistently market/deliver that technology under well-known brand names. As a result, virtually all companies have active strategies to further develop and obtain technology either through in-house research and development or through acquisition from other parties. Where technology is unavailable through in-house development, companies have increasingly looked toward licensing to enhance their ability to obtain such competitive attributes. Licensing is a transaction under which one party, the licensee, receives contractual permission to use the technology of another party, the licensor, where the technology is the intellectual property (IP) of the licensor. Under the license, the licensor maintains title in the IP, and the licensee is authorized to make use of the IP only in accordance with the terms and conditions of the license.

A company's ability to be successful becomes particularly difficult when the company is a relatively smaller company with limited resources competing in an industry or market with large companies. In particular, many smaller companies, while efficiently supporting research, development, and design of products, lack the resources to competitively manufacture the end products that are the results of their development efforts when they are competing against large companies with vast resources. As such, these smaller companies are often forced into one of two predominant business models.

One business model into which smaller companies are often forced is a licensing-only model under which the small company licenses their technology to other companies who then manufacture and sell products that include the licensed technology. Under this model the licensee typically pays a royalty rate to the licensor that is a percentage of the sales price of the manufactured products. A problem with this licensing-only model is that it does not allow the smaller company, the licensor, to build any company/brand recognition and often returns unpredictable revenue streams over which the licensor has little or no control.

Another business model into which smaller companies are often forced is a third-party manufacturing model in which the small company contracts for the manufacturing services of third-party manufacturing companies. The manufacturing companies then manufacture products exclusively for the small company. While this third-party manufacturer model overcomes the company/brand recognition problem of the licensing-only model by allowing the small company to market products under their company/brand name, it introduces other problems because the small company's product delivery now depends on a third-party. Consequently, the small company has limited control over the manufacturing process, product quality, delivery schedule, and more particularly the cost of the manufactured products.

One particular third-party manufacturing model is an exchange model under which the small company provides a license to their technology to a third-party in exchange for the manufacturing services of the third-party. The manufactured products are marketed by both the small and large company. The typical third-party company of this model is a large company that designs, manufactures, and sells products in the same market as the small company. As one example, the large company may be an integrated device manufacturer (IDM) that produces its own silicon wafers while the small company is a fabless company that focuses on the design and development of semiconductor chips and outsources the production of silicon wafers to an IDM. This technology-manufacturing exchange model is effectively an exchange of IP for manufacturing services that forces the small company to compete in a market with the large company under their respective brands.

Under this technology-manufacturing exchange model the small company (the licensor) licenses the technology of the product to the large company (the licensee) using an IP license agreement under which a pre-specified quantity of products are manufactured. Distribution of the manufactured products is divided between the companies according to a pre-specified split, also referred to as a target division or target split. The large company absorbs the manufacturing costs and, in addition, makes a pre-determined royalty payment to the small company, for each retained product. The royalty payment is calculated using a pre-specified royalty rate that is typically a percentage of a sales price of the product. The small company, in turn, pays the manufacturing costs along with a mark-up payment for each product received from the large company. The mark-up payment is calculated using a pre-specified mark-up rate that is typically a percentage of a raw material cost of the products. Both the large and small companies then compete in the same market for sales of the product.

As with the other models described above, this technology-manufacturing exchange model presents numerous problems to the small company. A first problem is that the small company has a higher product cost than the large company because the mark-up rate is typically higher than the royalty-rate. This higher product cost makes it more difficult for the small company to compete against the large company for sales of the product, especially in high-volume markets. With a lower product cost, for example, the large company can force the small company out of the market simply by lowering sales prices of the products.

Another problem with this technology-manufacturing exchange model relates to the dynamic nature of material costs and product sales prices. For example, the dynamic nature of many product markets relative to material cost prevents the small company from locking in long-term guarantees from the large company as to material cost, thereby forcing the small company to execute shorter-term deals. Further, the dynamic nature of sales prices often results in unstable revenue streams for the small company in the absence of complicated sliding royalty scales and the like which are difficult and expensive to negotiate. The large company, in contrast, can cope with the effects of these dynamic variables more easily because of their relative position and size in the market.

At the center of these problems is the fact that the typical license has royalty rates and the mark-up rates tied to different factors. As described above, the royalty rate is typically a percentage of a sales price of the corresponding products while the mark-up rate is typically a percentage of a raw material cost of the corresponding products. As the large company can exert more control over the sales price and material cost, the large company can more effectively control the market relative to the small company. Thus, significant departures from the target division of products specified in the license can lead to a strong market advantage for the large company in the absence of specific penalties in the license, thereby allowing the large company to drive the small company out of the market as a supplier of products. What is needed is a way for IP developers and small companies that lack manufacturing capabilities to effectively compete for sales in a market with large companies having design and manufacturing facilities.

Figure 1:
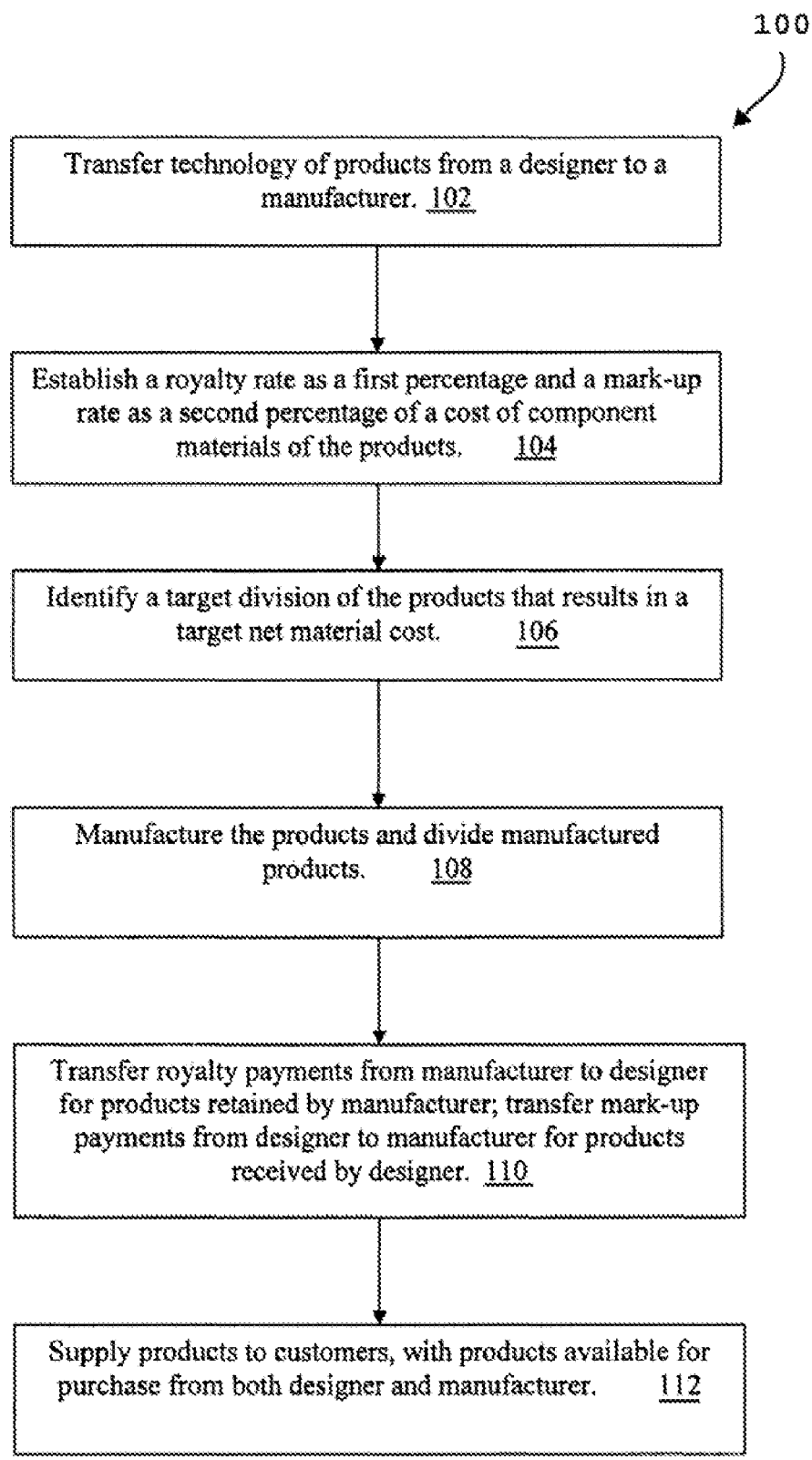
FIG. 1 is a flow diagram for the transfer of technology among parties, under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 104 is first introduced and discussed with respect to FIG. 1).

DETAILED DESCRIPTION

Methods of exchanging intellectual property (IP) and manufacturing services among competing parties are provided that include royalty rates and mark-up rates based on a common factor. The common factor of an embodiment includes the cost of a component material of a product, but is not so limited. The IP includes at least one of technology, patents, and trade secrets, but is not so limited. The methods include a first company that transfers technology in the form of IP to a second company which then uses the technology to manufacture products; the manufactured products are competitively sold in a market by both first and second companies. The first and second companies, in effecting the transfer, establish a royalty rate that is a first percentage of a cost of a component material of the products and a mark-up rate that is a second percentage of the cost of the component material. Further, the companies identify a target division or split of manufactured products that result in a target net material cost for each company.

Following manufacture of the products, the second company retains a portion of the manufactured products and supplies or distributes the remaining portion to the first company, in accordance with the target division. The first company makes a mark-up payment to the second company for each product received, where the mark-up payment is calculated using the mark-up rate. Likewise, the second company makes a royalty payment to the first company for each product retained, where the royalty payment is calculated using the royalty rate. The first and second companies then compete for sales of the products in the market.

The methods and models described herein, in basing both royalty rates and mark-up rates on a common factor, support transactions that automatically drive the parties toward the targeted distribution of products through deviations in net material costs. These deviations include an increased net material cost for a party selling above their target share accompanied by a decreased net material cost for the party selling below their target share. These methods and models, while providing natural incentives to parties to sell products in accordance with the target division, avoid assessing a large financial burden on a party (through the typical onerous royalty, for example) taking more than their target share of products when the other party chooses not to pursue the business. Thus, the increased net material cost is not increased so much as to be a severe penalty.

In the following description, numerous specific details are introduced to provide a thorough understanding of, and enabling description for, embodiments of the cost-based technology and manufacturing exchange. One skilled in the relevant art, however, will recognize that the cost-based technology and manufacturing exchange can be practiced without one or more of the specific details, or with other components, systems, etc. In other instances, well-known structures or operations are not shown, or are not described in detail, to avoid obscuring aspects of the cost-based technology and manufacturing exchange.

FIG. 1 is a flow diagram 100 for the transfer of technology among parties, under an embodiment. This flow diagram 100 provides an exchange model under which a first company (referred to as a designer company or designer) provides technology to a second company (referred to as a manufacturing company or manufacturer) in exchange for manufacturing services. This exchange model is referred to as a cost-based exchange, but is not so limited. Under the exchange model of an embodiment, the designer transfers technology in the form of IP to the manufacturer, at block 102. The companies establish a royalty rate that is a first percentage of a cost of at least one component material of the products and a mark-up rate that is a second percentage of the cost of the component material, at block 104. The companies also identify a target division of the manufactured products that results in a target net material cost for each company, at block 106.

Continuing, the manufacturer produces the products using the designer's technology, and divides the manufactured products in accordance with the target division, at block 108. Alternatively, the manufactured products are divided in accordance with the respective needs of the companies, wherein the actual division of products is then compared to the target division in order to calculate and/or adjust at least one of the royalty rate and the mark-up rate. The manufacturer retains a portion of the manufactured products, referred to as the manufacturer's portion, and supplies or distributes the remaining portion of the manufactured products, referred to as the designer's portion, to the designer. The designer makes at least one mark-up payment to the manufacturer for the products received in the designer's portion, at block 110. The mark-up payment is calculated using the mark-up rate. Likewise, the manufacturer makes at least one royalty payment to the designer for the products retained in the manufacturer's share, at block 110. The royalty payment is calculated using the royalty rate. The designer and manufacturer both supply products to customers in a market, at block 112.

Figure 2:
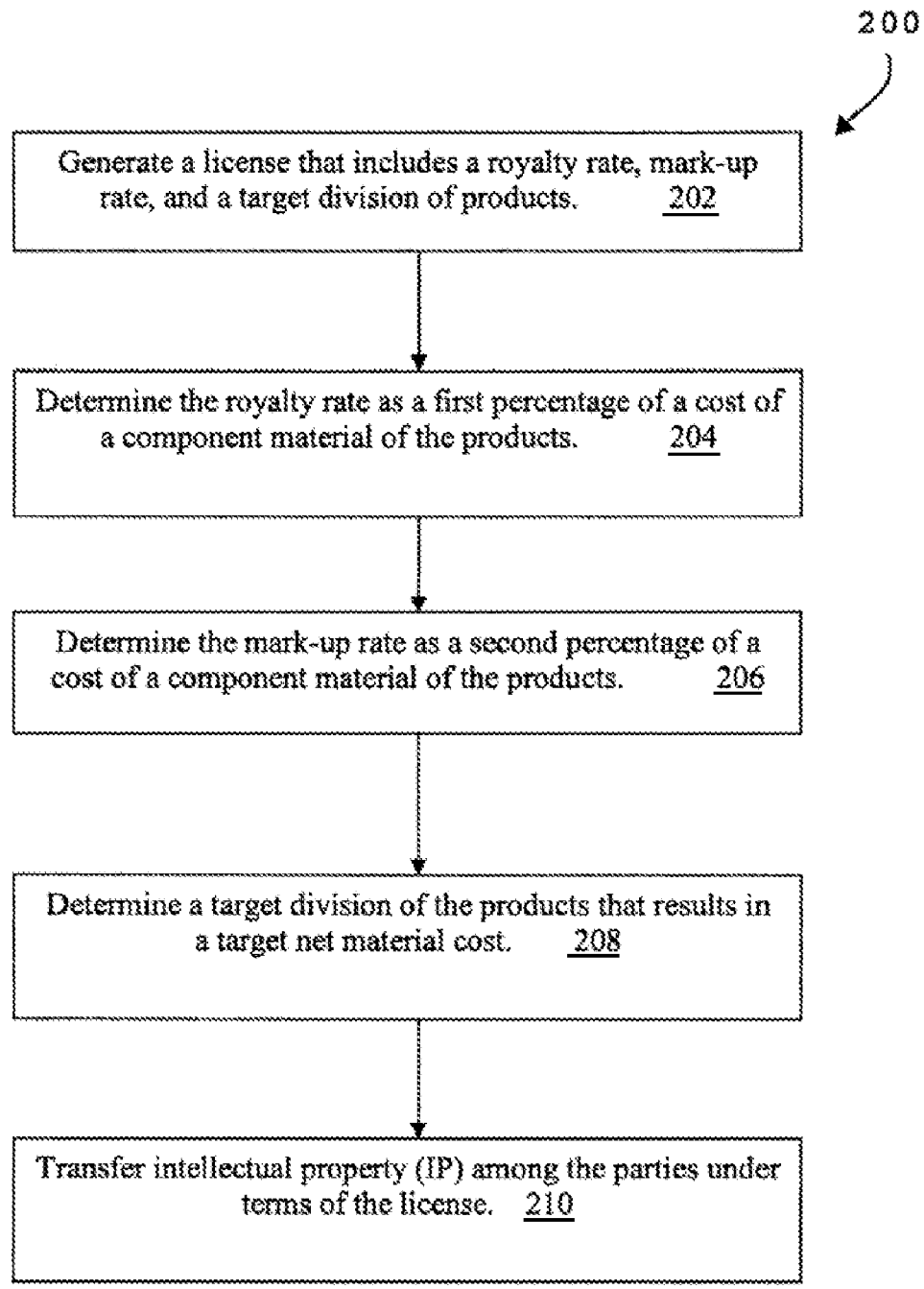
FIG. 2 is a flow diagram for generating a license for a technology transfer, under an embodiment.

The technology transfer of an embodiment occurs under the terms of a contract referred to herein as a license or license agreement. FIG. 2 is a flow diagram 200 for generating a license for a technology transfer, under an embodiment. This flow diagram 200 generally provides a license model under which the parties to the agreement include a first party, referred to as a licensor, and a second party, referred to as a licensee. The licensor provides technology to the licensee in exchange for manufacturing services, but the embodiment is not so limited as development NRE or one-time license fees may be included. This license model is referred to as a cost-based license, but is not so limited.

Under this license model, the licensor and licensee generate a license that includes a royalty rate, a mark-up rate, and a target division of manufactured products, at block 202. The license also includes other terms and conditions known in the art as being appropriate to the parties and the agreement, the description of which is omitted herein for clarity. The parties establish a royalty rate that is a first percentage of a cost of at least one component material of the products, at block 204. Further, the parties establish a mark-up rate that is a second percentage of the cost of the component material, at block 206. The companies also identify a target division of the manufactured products that results in a target net material cost for each company, at block 208. The target division includes a first portion of manufactured products allocated for retention by the licensee (referred to as the licensee's portion) and a second portion of manufactured products (referred to as the licensor's portion) allocated for distribution to the licensor. The parties transfer the technology at issue in the form of IP under the terms of the license, at block 210.

Continuing with an example of actions of the parties under the license, the licensee manufactures products under the license using the licensor's technology and allocates the manufactured products in accordance with the respective company demand or target division. The licensee retains the licensee's portion of the manufactured products and supplies or distributes the licensor's portion to the licensor. The licensor makes mark-up payments (in addition to cost for the value generated by the manufacturer) to the licensee in exchange for the licensor's share of received products, where the mark-up payments are in accordance with the mark-up rate. The licensee in turn makes royalty payments to the licensor in exchange for the licensee's share of the retained products, where the royalty payments are in accordance with the royalty rate. The licensor and licensee subsequently compete for sales of the product in a market.

The cost-based exchange and license models described herein provide control mechanisms that allow technology development companies like design companies to compete as product suppliers in markets alongside large manufacturing companies. These control mechanisms include, for example, a progressively increasing net material cost to a party taking more than their allocated share of products, as demonstrated in the examples below; the increasing net material cost results in greater margins to the party that sells below their target. Further, the party taking less than their allocated share of products realizes a progressively decreasing net material cost. The increase/decrease of the net material cost provides incentive to the parties to sell products in accordance with the target product divisions by financially discouraging a large company from taking all of the products and effectively driving a small company out of the market. The cost-based exchange and license models are flexible in that control mechanism strength and the product division(s) at which the mechanisms are realized when moving away from a target division can be tailored to particular scenarios by the parties. In addition to the natural incentives provided in the cost-based exchange and license model, penalties can be used at one or more product divisions when moving away from the target division to further increase the magnitude of the incentive, as described below.

Central to these control mechanisms is an understanding that the relative competitiveness of product companies is typically controlled by the average cost of component materials of the products provided by the companies. Consequently, the models described herein provide incentives by basing both the royalty and mark-up rates on a common factor that is the cost of at least one of the component materials of the product. The incentives, therefore, equalize the effects of fluctuations in material costs on both parties and provide the small company with pricing power in the market that rivals that of the large company. In addition to the natural incentives, the methods and models described herein also make the actual value of the common factor, the material cost, irrelevant to the transaction because the common factor has a relatively equivalent impact on both parties.

The models described herein also provide increased financial stability to the licensor by removing the dependency of the royalty payments on the sales price of the product. As an example, the financial impact of market-driven changes in sales price on the royalty stream is lessened or eliminated because fluctuations in the sales price do not affect the royalty payments. Also, a decrease in sales price by a licensee relative to that of the licensor, while increasing the sales of the licensee, also increases the net material cost to the licensee. The increased net material cost to the licensee results in a decreased net material cost and an accompanying increase in profit margin for the licensor. Further, as the royalty payments are not based on sales price, the methods and models eliminate the need for sharing pricing and other accounting information among the parties.

Additionally, the models herein have a self-regulating effect with regard to reporting of manufacturing costs by the manufacturer (licensee). Of concern is the possibility that the manufacturer inflates the manufacturing costs in order to increase the cost payments received from the technology company (licensor) for their share of product. Under the models described herein, the effect of increasing manufacturing costs is an increase in the royalty payments paid by the manufacturer to the technology company. Thus, artificial increases in manufacturing costs are self-defeating.

Figure 3:
FIG. 3 is a summary of net material costs for each of the parties to a technology transfer for example product allocations, under an embodiment.

A number of example product splits are described below using the methods of exchanging intellectual property (IP) described above. These examples include use of a license agreement between the parties, but the exchange can occur in the absence of a license agreement or under terms of other types of agreements known in the art. FIG. 3 is a summary 300 of net material costs for each of the parties for the example product splits described below, under an embodiment. These examples show that deviations from the target division of products result in variations in net material cost. These examples are presented for illustration only and are not to be considered limiting, as many variations are contemplated to accommodate the needs of the parties to any exchange agreement.

In one example, the parties to the license include a designer or developer of technology and a manufacturer of products that include the technology. Under the license, the designer licenses IP to the manufacturer, and the manufacturer (the licensee) manufactures the corresponding products under the license. The manufacturer retains a manufacturer's share of the products in accordance with a predetermined target division or split or the manufacturer's customer demand of the products, where the retained products will be sold by the manufacturer in the market as appropriate. Likewise, the manufacturer supplies or distributes the licensors share of the manufactured products to the licensor in accordance with the predetermined target division or the licensor's customer demand. The licensor also sells the products in the market as appropriate.

This example assumes the manufactured product to be a widget, and one of the basic component materials of the widget is Material X. The widget can be, by way of illustration, an integrated silicon device, also referred to as an integrated circuit (IC) or chip, in which the basic component material is a silicon wafer, but the widget and the component material are not so limited. The parties agree that the target division of manufactured products provides 54 widgets to the manufacturer and 46 widgets to the designer out of each group of 100 widgets manufactured, but any target division is contemplated hereunder.

Continuing with the example, the parties agree that the royalty rate and the mark-up rate are each a percentage of the cost of Material X, where the cost of Material X for this example is $100 per widget. The parties agree on a mark-up rate of 40%, so the designer pays the manufacturer a mark-up payment (in addition to the cost of the material) approximately equal to 40% times the cost of Material X ($100×40%=$40) for each of the 46 widgets acquired from the manufacturer under the license. Likewise, the parties agree on a royalty rate of 34.07%, so the manufacturer pays the designer a royalty payment approximately equal to 34.07% times the cost of Material X ($100×34.07%=$34.07) for each of the 54 widgets retained by the manufacturer.

The royalty rate of an embodiment is determined so that a first ratio of a number of products allocated to the designer to a number of products allocated to the manufacturer is approximately equal to a second ratio of the royalty rate to the mark-up rate, but the embodiment is not so limited. This formula provides the royalty rate of 34.07% for this example ((46÷54)×40%=34.07%), but any royalty rate can be selected by the parties and/or calculated using any of a number of methods/formulas known in the art.

Using the royalty rate, mark-up rate, and target division selected for this example, a number of scenarios are described below. These scenarios show the effects on net material cost as the division of manufactured products deviates from the target division. These scenarios, therefore, illustrate the incentive the model provides for the parties to sell widgets in accordance with the target division. A first scenario is one in which the parties sell products in accordance with the target division of manufactured products. A second scenario is one in which the manufacturer exceeds the manufacturer's share of products under the target division. A third scenario is one in which the designer exceeds the designer's share of manufactured products under the target division. All net widget costs shown in these three scenarios and the accompanying examples are rounded to the nearest dollar.

The first scenario is one in which the parties sell products in accordance with the target division of manufactured products. When the manufacturer retains the target number of 54 manufactured widgets for resale, the manufacturer makes a royalty payment to the designer that is approximately $1,840 (54 widgets×($100×34.07%)=$1,840). When the designer acquires the target number of 46 manufactured widgets from the manufacturer, the designer makes a mark-up payment to the manufacturer that is approximately $1,840 (46 widgets×($100×40%)=$1,840). As the manufacturer makes a royalty payment of $1,840 to the designer and receives a mark-up payment of $1,840 from the designer, the manufacturer has a net outlay/benefit of approximately zero ($1,840−$1,840=0) and, consequently, a net material cost of approximately $100 per widget ($100+/−0=$100). As the designer makes a mark-up payment of $1,840 to the manufacturer and receives a royalty payment of $1,840 from the manufacturer, the designer also has a net outlay/benefit of approximately zero ($1,840−$1,840=0) and, consequently, a net material cost of $100 per widget ($100+/−0=$100). Thus, both the manufacturer and the designer are in substantially equivalent positions in the market relative to net material cost.

The second scenario is one in which the manufacturer exceeds the manufacturers share of manufactured products under the target division. Several example deviations are presented under this scenario in order to show the progressive increase in the net material cost as the manufacturers share continues to increase over the target share.

In a first deviation example the manufacturer retains 60 manufactured widgets for resale, leaving the designer with 40 manufactured widgets. The manufacturer makes a royalty payment to the designer that is approximately $2,044 for the retained widgets (60 widgets×($100×34.07%)=$2,044). When the designer acquires the 40 manufactured widgets, the designer makes a mark-up payment to the manufacturer that is approximately $1,600 (40 widgets×($100×40%)=$1,600).

As the manufacturer makes a royalty payment of $2,044 to the designer and receives a mark-up payment of $1,600 from the designer, the manufacturer has a net outlay of approximately $444 ($2,044−$1,600=$444). When the $444 net outlay is spread over the 60 widgets retained, the manufacturer has a net material cost of approximately $107 per widget ($100+($444÷60)=$107). Thus, the manufacturer's net material cost has increased by approximately $7 per widget over the net material cost at the target division.

In contrast, the designer makes a mark-up payment of approximately $1,600 to the manufacturer and receives a royalty payment of approximately $2,044 from the manufacturer, resulting in a net benefit of approximately $444 for the designer. When the $444 benefit is spread over the 40 widgets acquired by the designer, the designer has a net material cost of approximately $89 per widget ($100−($444÷40)=$89). Thus, the designer's net material cost has decreased by approximately $11 per widget over the net material cost at the target division.

In a second deviation example the manufacturer retains 70 manufactured widgets for resale, leaving the designer with 30 manufactured widgets. The manufacturer makes a royalty payment to the designer that is approximately $2,385 for the retained widgets (70 widgets×($100×34.07%)=$2,385). When the designer acquires the 30 manufactured widgets, the designer makes a mark-up payment to the manufacturer that is approximately $1,200 (30 widgets×($100×40%)=$1,200).

As the manufacturer makes a royalty payment of $2,385 to the designer and receives a mark-up payment of $1,200 from the designer, the manufacturer has a net outlay of approximately $1,185 ($2,385−$1,200=$1,185). When the $1,185 net outlay is spread over the 70 widgets retained, the manufacturer has a net material cost of approximately $117 per widget ($100+($1,185÷70)=$117). Thus, the manufacturer's net material cost has increased by approximately $17 per widget over the net material cost at the target division.

In contrast, the designer makes a mark-up payment of approximately $1,200 to the manufacturer and receives a royalty payment of approximately $2,385 from the manufacturer, resulting in a net benefit of approximately $1,185 for the designer. When the $1,185 benefit is spread over the 30 widgets acquired by the designer, the designer has a net material cost of approximately $61 per widget ($100−($1,185÷30)=$61). Thus, the designer's net material cost has decreased by approximately $39 per widget over the net material cost at the target division.

In a third deviation example the manufacturer retains 80 manufactured widgets for resale, leaving the designer with 20 manufactured widgets. The manufacturer makes a royalty payment to the designer that is approximately $2,726 for the retained widgets (80 widgets×($100×34.07%)=$2,726). When the designer acquires the 20 manufactured widgets, the designer makes a mark-up payment to the manufacturer that is approximately $800 (20 widgets×($100×40%)=$800).

As the manufacturer makes a royalty payment of $2,726 to the designer and receives a mark-up payment of $800 from the designer, the manufacturer has a net outlay of approximately $1,926 ($2,726−$800=$1,926). When the $1,926 net outlay is spread over the 80 widgets retained, the manufacturer has a net material cost of approximately $124 per widget ($100+($1,926÷80)=$124). Thus, the manufacturer's net material cost has increased by approximately $24 per widget over the net material cost at the target division.

In contrast, the designer makes a mark-up payment of approximately $800 to the manufacturer and receives a royalty payment of approximately $2,726 from the manufacturer, resulting in a net benefit of approximately $1,926 for the designer. When the $1,926 benefit is spread over the 20 widgets acquired by the designer, the designer has a net material cost of approximately $4 per widget ($100−($1,926÷20)=$4). Thus, the designer's net material cost has decreased by approximately $96 per widget over the net material cost at the target division.

In a fourth deviation example the manufacturer retains 90 manufactured widgets for resale, leaving the designer with 10 manufactured widgets. The manufacturer makes a royalty payment to the designer that is approximately $3,066 for the retained widgets (90 widgets×($100×34.07%)=$3,066). When the designer acquires the 10 manufactured widgets, the designer makes a mark-up payment to the manufacturer that is approximately $400 (10 widgets×($100×40%)=$400).

As the manufacturer makes a royalty payment of $3,066 to the designer and receives a mark-up payment of $400 from the designer, the manufacturer has a net outlay of approximately $2,666 ($3,066−$400=$2,666). When the $2,666 net outlay is spread over the 90 widgets retained, the manufacturer has a net material cost of approximately $130 per widget ($100+($2,666÷90)=$130). Thus, the manufacturer's net material cost has increased by approximately $30 per widget over the net material cost at the target division.

In contrast, the designer makes a mark-up payment of approximately $400 to the manufacturer and receives a royalty payment of approximately $3,066 from the manufacturer, resulting in a net benefit of approximately $2,666 for the designer. When the $2,666 benefit is spread over the 10 widgets acquired by the designer, the designer has a net material cost of approximately −$167 per widget ($100−($2,666÷10)=−$167). Thus, the manufacturer's net material cost has decreased by approximately $267 per widget over the net material cost at the target division.

With reference to FIG. 3 and the summary 300 of net material costs for each of the parties for the product splits described above, this analysis shows that as the manufacturer (MFR) retains an increasing share 302 of widgets the manufacturer realizes a higher net material cost. In contrast, the designer (DES) realizes a decreasing net material cost and, therefore, is in a better position in the market relative to the manufacturer with regard to net material cost. These deviations in net material cost, in the absence of other factors, tend to cause corrective behavior of the parties by incentivizing the manufacturer to return to the target division of products with a resultant decrease in net material cost.

The third scenario is one in which the designer exceeds the designer's share of manufactured products under the target division. Several example deviations are presented under this scenario in order to show the progressive increase in the net material cost as the designers share continues to increase over the target share.

In a first deviation example the manufacturer retains 50 manufactured widgets for resale, leaving the designer with 50 manufactured widgets. The manufacturer makes a royalty payment to the designer that is approximately $1,704 for the retained widgets (50 widgets×($100×34.07%)=$1,704). When the designer acquires the 50 manufactured widgets, the designer makes a mark-up payment to the manufacturer that is approximately $2,000 (50 widgets×($100×40%)=$2,000).

As the designer makes a mark-up payment of $2,000 to the manufacturer and receives a royalty payment of $1,704 from the manufacturer, the designer has a net outlay of approximately $296 ($2,000−$1,704=$296). When the $296 net outlay is spread over the 50 widgets received, the designer has a net material cost of approximately $106 per widget ($100+($296÷50)=$106). Thus, the designer's net material cost has increased by approximately $6 per widget over the net material cost at the target division.

In contrast, the manufacturer makes a royalty payment of approximately $1,704 to the designer and receives a mark-up payment of approximately $2,000 from the designer, resulting in a net benefit of approximately $296 for the manufacturer. When the $296 benefit is spread over the 50 widgets retained by the manufacturer, the manufacturer has a net material cost of approximately $94 per widget ($100−($296÷50)=$94). Thus, the manufacturer's net material cost has decreased by approximately $6 per widget over the net material cost at the target division.

In a second deviation example the manufacturer retains 40 manufactured widgets, leaving 60 manufactured widgets available to the designer. The manufacturer makes a royalty payment to the designer that is approximately $1,363 for the retained widgets (40 widgets×($100×34.07%)=$1,363). When the designer acquires the 60 manufactured widgets, the designer makes a mark-up payment to the manufacturer that is approximately $2,400 (60 widgets×($100×40%)=$2,400).

As the designer makes a mark-up payment of $2,400 to the manufacturer and receives a royalty payment of $1,363 from the manufacturer, the designer has a net outlay of approximately $1,037 ($2,400−$1,363=$1,037). When the $1,037 net outlay is spread over the 60 widgets received, the designer has a net material cost of approximately $117 per widget ($100+($1,037÷60)=$117). Thus, the designer's net material cost has increased by approximately $17 per widget over the net material cost at the target division.

In contrast, the manufacturer makes a royalty payment of approximately $1,363 to the designer and receives a mark-up payment of approximately $2,400 from the designer, resulting in a net benefit of approximately $1,037 for the manufacturer. When the $1,037 benefit is spread over the 40 widgets retained by the manufacturer, the manufacturer has a net material cost of approximately $74 per widget ($100−($1,037÷40)=$74). Thus, the manufacturer's net material cost has decreased by approximately $26 per widget over the net material cost at the target division.

In a third deviation example the manufacturer retains 30 manufactured widgets, leaving 70 manufactured widgets available to the designer. The manufacturer makes a royalty payment to the designer that is approximately $1,022 for the retained widgets (30 widgets×($100×34.07%)=$1,022). When the designer acquires the 70 manufactured widgets, the designer makes a mark-up payment to the manufacturer that is approximately $2,800 (70 widgets×($100×40%)=$2,800).

As the designer makes a mark-up payment of $2,800 to the manufacturer and receives a royalty payment of $1,022 from the manufacturer, the designer has a net outlay of approximately $1,778 ($2,800−$1,022=$1,778). When the $1,778 net outlay is spread over the 70 widgets received, the designer has a net material cost of approximately $125 per widget ($100+($1,778÷70)=$125). Thus, the designer's net material cost has increased by approximately $25 per widget over the net material cost at the target division.

In contrast, the manufacturer makes a royalty payment of approximately $1,022 to the designer and receives a mark-up payment of approximately $2,800 from the designer, resulting in a net benefit of approximately $1,778 for the manufacturer. When the $1,778 benefit is spread over the 30 widgets retained by the manufacturer, the manufacturer has a net material cost of approximately $41 per widget ($100−($1,778÷30)=$41). Thus, the manufacturer's net material cost has decreased by approximately $59 per widget over the net material cost at the target division.

In a fourth deviation example the manufacturer retains 20 manufactured widgets, leaving 80 manufactured widgets available to the designer. The manufacturer makes a royalty payment to the designer that is approximately $681 for the retained widgets (20 widgets×($100×34.07%)=$681). When the designer acquires the 80 manufactured widgets, the designer makes a mark-up payment to the manufacturer that is approximately $3,200 (80 widgets×($100×40%)=$3,200).

As the designer makes a mark-up payment of $3,200 to the manufacturer and receives a royalty payment of $681 from the manufacturer, the designer has a net outlay of approximately $2,519 ($3,200−$681=$2,519). When the $2,519 net outlay is spread over the 80 widgets received, the designer has a net material cost of approximately $131 per widget ($100+($2,519÷80)=$131). Thus, the designer's net material cost has increased by approximately $31 per widget over the net material cost at the target division.

In contrast, the manufacturer makes a royalty payment of approximately $681 to the designer and receives a mark-up payment of approximately $3,200 from the designer, resulting in a net benefit of approximately $2,519 for the manufacturer. When the $2,519 benefit is spread over the 20 widgets retained by the manufacturer, the manufacturer has a net material cost of approximately −$26 per widget ($100−($2,519÷20)=−$26). Thus, the manufacturer's net material cost has decreased by approximately $126 per widget over the net material cost at the target division.

In a fifth deviation example the manufacturer retains 10 manufactured widgets, leaving 90 manufactured widgets available to the designer. The manufacturer makes a royalty payment to the designer that is approximately $341 for the retained widgets (10 widgets×($100×34.07%)=$341). When the designer acquires the 90 manufactured widgets, the designer makes a mark-up payment to the manufacturer that is approximately $3,600 (90 widgets×($100×40%)=$3,600).

As the designer makes a mark-up payment of $3,600 to the manufacturer and receives a royalty payment of $341 from the manufacturer, the designer has a net outlay of approximately $3,259 ($3,600−$341=$3,259). When the $3,259 net outlay is spread over the 90 widgets received, the designer has a net material cost of approximately $136 per widget ($100+($3,259÷90)=$136). Thus, the designer's net material cost has increased by approximately $36 per widget over the net material cost at the target division.

In contrast, the manufacturer makes a royalty payment of approximately $341 to the designer and receives a mark-up payment of approximately $3,600 from the designer, resulting in a net benefit of approximately $3,259 for the manufacturer. When the $3,259 benefit is spread over the 10 widgets retained by the manufacturer, the manufacturer has a net material cost of approximately −$226 per widget ($100−($3,259÷10)=−$226). Thus, the manufacturer's net material cost has decreased by approximately $326 per widget over the net material cost at the target division.

Returning to FIG. 3 and the summary 300 of net material costs for each of the parties for the product splits described above, this analysis shows that as the designer (DES) retains an increasing share 304 of widgets the designer realizes a higher net material cost. In contrast, the manufacturer (MFR) realizes a decreasing net material cost and, therefore, is in a better position in the market relative to the designer with regard to net material cost. These deviations in net material cost, in the absence of other factors, tend to cause corrective behavior of the parties by incentivizing the designer to return to the target division of products with a resultant decrease in net material cost.

Figure 4:
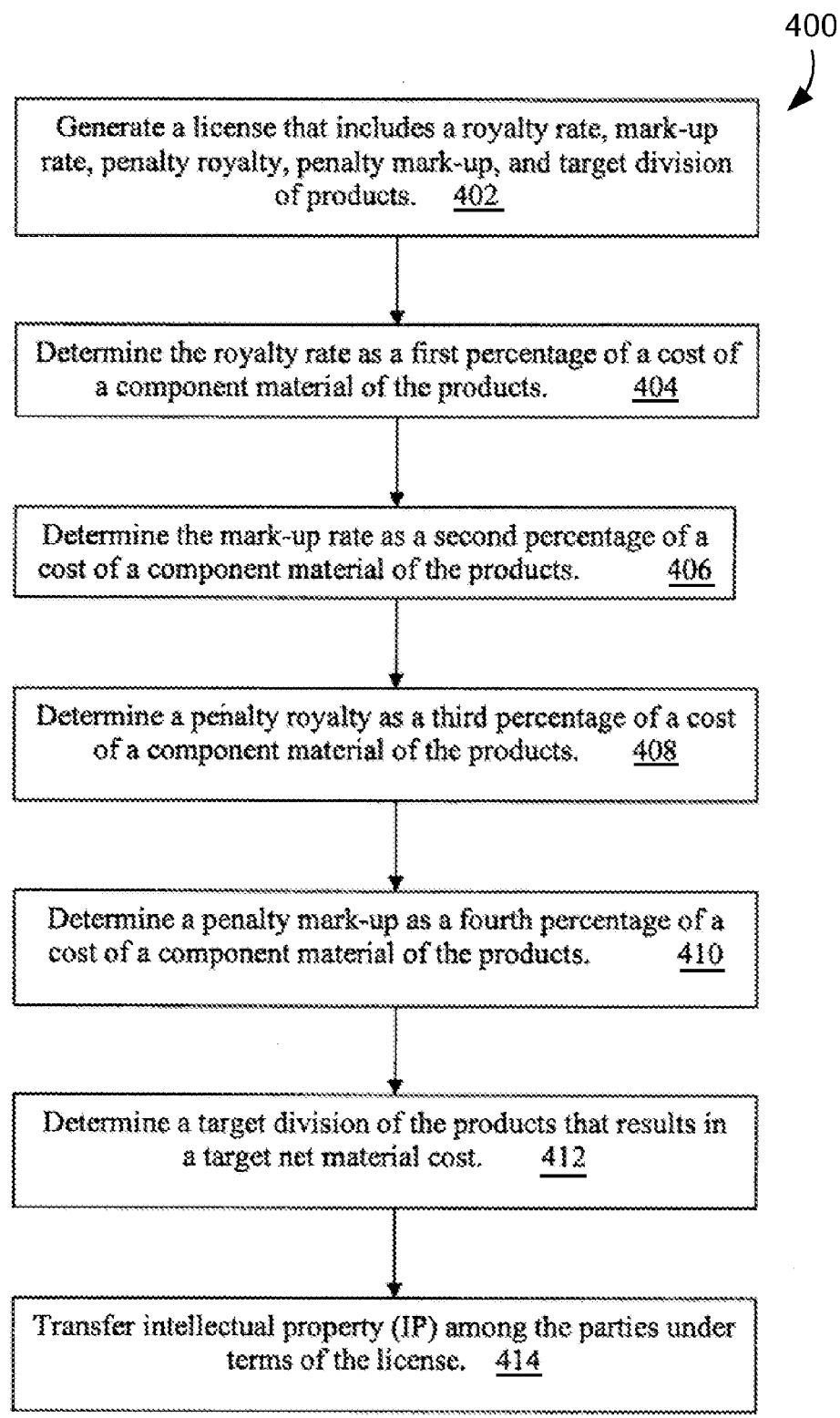
FIG. 4 is a flow diagram for generating a technology transfer license that includes penalty rates, under an alternative embodiment of FIG. 2.

While the methods described above provide incentives that discourage deviations from the target division by the parties, stronger incentives are sometimes used to further stabilize the relationship between the parties to a transaction. These incentives often come in the form of penalty fees tied to deviations from one or more terms of a license. The technology transfer methods and models of an embodiment, therefore, can include penalty rates along with the royalty rates and mark-up rates for product splits that deviate from the target division. FIG. 4 is a flow diagram 400 for generating a technology transfer license that includes penalty rates, under an alternative embodiment of FIG. 2. This flow diagram 400 generally provides a license model under which the parties to the license include a licensor and a licensee, as described above, and the licensor provides technology to the licensee in exchange for manufacturing services. Use of this model is not limited to a license, however, and can be used in support of other technology transfers outside of license agreements or under other types of agreements.

Under this license model, the licensor and licensee generate a license that includes a royalty rate, a mark-up rate, a penalty royalty rate, a penalty mark-up rate, and a target division of manufactured products, at block 402. The license also includes other terms and conditions known in the art as being appropriate to the parties, the description of which is omitted herein for clarity. The parties establish a royalty rate that is a first percentage of a cost of at least one component material of the products, at block 404. Further, the parties establish a mark-up rate that is a second percentage of the cost of the component material, at block 406. The parties also establish at least one penalty royalty rate, at block 408, that is a third percentage of the cost of the component material. Moreover, the parties establish at least one penalty mark-up rate, at block 410, that is a fourth percentage of the cost of the component material. While one embodiment uses a single penalty royalty rate and a single mark-up royalty rate for all deviations from the target division, regardless of magnitude, alternative embodiments can use multiple penalty rates for differing magnitudes of deviation from the target division.

Continuing, the companies identify a target division of the manufactured products that results in a target net material cost for each company, at block 412. The target division includes the licensee's portion and the licensor's portion as described above. The parties transfer the technology at issue in the form of IP under the terms of the license, at block 414.

Continuing with an example of actions of the parties under the license, the licensee manufactures products under the license using the licensor's technology and allocates the manufactured products according to the target division. The licensee retains the licensee's portion of the manufactured products and supplies or distributes the licensor's portion to the licensor. The licensor makes mark-up payments to the licensee in exchange for the licensor's share of received products, where the mark-up payments are in accordance with the mark-up rate. In addition to the mark-up payment the licensor makes a penalty mark-up payment for each product taken by the licensor over the licensor's portion of the products. The penalty mark-up payment is in accordance with the penalty mark-up rate.

The licensee makes royalty payments to the licensor in exchange for the licensee's share of the retained products, where the royalty payments are in accordance with the royalty rate. In addition to the royalty payments the licensee makes a penalty royalty payment for each product taken by the licensee over the licensee's portion of the products. The penalty royalty payment is in accordance with the penalty royalty rate. The licensor and licensee subsequently compete for sales of the product in a market.

A number of example product splits are described below using the methods of exchanging intellectual property (IP) that include penalty payments described herein.

Figure 5:
FIG. 5 is a summary of net material costs for each of the parties to a technology transfer for example product allocations that include penalty payments, under an embodiment.

These examples include use of a license agreement between the parties, but the exchange can occur in the absence of a license agreement or under terms of other types of agreements known in the art. FIG. 5 is a summary 500 of net material costs for each of the parties for the example product splits described below, under an embodiment. These examples show that deviations from the target division of products result in variations in net material cost. These examples are presented for illustration only and are not to be considered limiting, as many variations are contemplated to accommodate the needs of the parties to any exchange agreement.

While the example and scenarios described above used a fixed royalty rate and mark-up rate regardless of the division of manufactured products, scenarios follow that assess penalty fees to a party taking more than an allocated share of manufactured products under the license. As with the royalty and mark-up rates, the penalty fees are each a percentage of the cost of Material X, but alternative agreements can assess penalty fees on and/or as percentages of other factors. As described above, the manufactured product is a widget that includes Material X as a basic component material. The parties agree that the target division of manufactured products provides 54 widgets to the manufacturer and 46 widgets to the designer out of each group of 100 widgets manufactured, but any target division is contemplated hereunder.

Continuing, the royalty rate and the mark-up rate are each a percentage of the cost of Material X, where the cost of Material X for this example is $100 per widget. The parties agree on a mark-up rate of 40%, so the designer makes a mark-up payment to the manufacturer that is approximately equal to 40% times the cost of Material X ($100×40%=$40) for each of the 46 widgets acquired from the manufacturer under the license. Likewise, the parties agree on a royalty rate of 34.07%, so the manufacturer makes a royalty payment to the designer that is approximately equal to 34.07% times the cost of Material X ($100×34.07%=$34.07) for each of the 54 widgets retained by the manufacturer.

Further, the parties agree on a penalty mark-up rate of 65%, so the designer pays the manufacturer a penalty mark-up payment approximately equal to 65% times the cost of Material X ($100×65%=$65) for each widget acquired beyond the target number of 46 widgets designated for the designer. Therefore, the designer makes payments approximately equal to 105% (40% mark-up+65% penalty mark-up=105%) times the cost of Material X for each widget acquired beyond the target number of 46 widgets. The point at which the penalty mark-up rate applies can be a point other than the target market share given in this example.

Likewise, the parties agree on a penalty royalty rate of 50%, so the manufacturer pays the designer a penalty royalty payment approximately equal to 50% times the cost of Material X ($100×50%=$50) for each widget acquired beyond the target number of 54 widgets designated for the manufacturer. Therefore, the manufacturer makes payments approximately equal to 84% (34% royalty+50% penalty royalty=84%) times the cost of Material X for each widget acquired beyond the target number of 54 widgets.

Using the royalty rate, penalty royalty rate, mark-up rate, penalty mark-up rate, and target division selected for this example, a number of scenarios are described below. These scenarios show the effects on net material cost as the division of manufactured products deviates from the target division. These scenarios, therefore, illustrate the incentive the model provides for the parties to sell widgets in accordance with the target division. A first scenario is one in which the parties sell products in accordance with the target division of manufactured products. A second scenario is one in which the manufacturer exceeds the manufacturer's share of products under the target division. A third scenario is one in which the designer exceeds the designer's share of manufactured products under the target division. All net widget costs shown in these three scenarios and the accompanying examples are rounded to the nearest dollar.

The first scenario is one in which the parties sell products in accordance with the target division of manufactured products. When the manufacturer retains the target number of 54 manufactured widgets for resale, the manufacturer makes a royalty payment to the designer that is approximately $1,840 (54 widgets×($100×34.07%)=$1,840); no penalty royalty payment is due. When the designer acquires the target number of 46 manufactured widgets from the manufacturer, the designer makes a mark-up payment to the manufacturer that is approximately $1,840 (46 widgets×($100×40%)=$1,840); no penalty mark-up payment is due.

As the manufacturer makes a royalty payment of $1,840 to the designer and receives a mark-up payment of $1,840 from the designer, the manufacturer has a net outlay/benefit of approximately zero ($1,840−$1,840=0) and, consequently, a net material cost of approximately $100 per widget ($100+/−0=$100). As the designer makes a mark-up payment of $1,840 to the manufacturer and receives a royalty payment of $1,840 from the manufacturer, the designer also has a net outlay/benefit of approximately zero ($1,840−$1,840=0) and, consequently, a net material cost of $100 per widget ($100+/−0=$100). Thus, both the manufacturer and the designer are in substantially equivalent positions in the market relative to net material cost.

The second scenario is one in which the manufacturer exceeds the manufacturers share of manufactured products under the target division. Several example deviations are presented under this scenario in order to show the progressive increase in the net material cost as the manufacturers share continues to increase over the target share.

In a first deviation example the manufacturer retains 60 manufactured widgets for resale, leaving the designer with 40 manufactured widgets. The manufacturer makes a royalty payment to the designer that is approximately $2,044 for the retained widgets (60 widgets×($100×34.07%)=$2,044). Further, the manufacturer makes a penalty royalty payment to the designer that is approximately $300 for the number of retained widgets that exceeds the target ((60−54)×($100×50%)=$300). When the designer acquires the 40 manufactured widgets, the designer makes a mark-up payment to the manufacturer that is approximately $1,600 (40 widgets×($100×40%)=$1,600).

As the manufacturer makes payments totaling $2,344 to the designer and receives a mark-up payment of $1,600 from the designer, the manufacturer has a net outlay of approximately $744 ($2,344−$1,600=$744). When the $744 net outlay is spread over the 60 widgets retained, the manufacturer has a net material cost of approximately $112 per widget ($100+($744÷60)=$112). Thus, the manufacturer's net material cost has increased by approximately $12 per widget over the net material cost at the target division.

In contrast, the designer makes a mark-up payment of approximately $1,600 to the manufacturer and receives payments totaling approximately $2,344 from the manufacturer, resulting in a net benefit of approximately $744 for the designer. When the $744 benefit is spread over the 40 widgets acquired by the designer, the designer has a net material cost of approximately $81 per widget ($100−($744÷40)=$81). Thus, the designer's net material cost has decreased by approximately $19 per widget over the net material cost at the target division.

In a second deviation example the manufacturer retains 70 manufactured widgets for resale, leaving the designer with 30 manufactured widgets. The manufacturer makes a royalty payment to the designer that is approximately $2,385 for the retained widgets (70 widgets×($100×34.07%)=$2,385). Further, the manufacturer makes a penalty royalty payment to the designer that is approximately $800 for the number of retained widgets that exceeds the target ((70−54)×($100×50%)=$800). When the designer acquires the 30 manufactured widgets, the designer makes a mark-up payment to the manufacturer that is approximately $1,200 (30 widgets×($100×40%)=$1,200).

As the manufacturer makes payments totaling $3,185 to the designer and receives a mark-up payment of $1,200 from the designer, the manufacturer has a net outlay of approximately $1,985 ($3,185−$1,200=$1,985). When the $1,985 net outlay is spread over the 70 widgets retained, the manufacturer has a net material cost of approximately $128 per widget ($100+($1,985÷70)=$128). Thus, the manufacturer's net material cost has increased by approximately $28 per widget over the net material cost at the target division.

In contrast, the designer makes a mark-up payment of approximately $1,200 to the manufacturer and receives a royalty payment of approximately $3,185 from the manufacturer, resulting in a net benefit of approximately $1,985 for the designer. When the $1,985 benefit is spread over the 30 widgets acquired by the designer, the designer has a net material cost of approximately $34 per widget ($100−($1,985÷30)=$34). Thus, the designer's net material cost has decreased by approximately $66 per widget over the net material cost at the target division.

In a third deviation example the manufacturer retains 80 manufactured widgets for resale, leaving the designer with 20 manufactured widgets. The manufacturer makes a royalty payment to the designer that is approximately $2,726 for the retained widgets (80 widgets×($100×34.07%)=$2,726). Further, the manufacturer makes a penalty royalty payment to the designer that is approximately $1,300 for the number of retained widgets that exceeds the target ((80−54)×($100×50%)=$1,300). When the designer acquires the 20 manufactured widgets, the designer makes a mark-up payment to the manufacturer that is approximately $800 (20 widgets×($100×40%)=$800).

As the manufacturer makes payments totaling $4,026 to the designer and receives a mark-up payment of $800 from the designer, the manufacturer has a net outlay of approximately $3,226 ($4,026−$800=$3,226). When the $3,226 net outlay is spread over the 80 widgets retained, the manufacturer has a net material cost of approximately $140 per widget ($100+($3,226÷80)=$140). Thus, the manufacturer's net material cost has increased by approximately $40 per widget over the net material cost at the target division.

In contrast, the designer makes a mark-up payment of approximately $800 to the manufacturer and receives a royalty payment of approximately $4,026 from the manufacturer, resulting in a net benefit of approximately $3,226 for the designer. When the $3,226 benefit is spread over the 20 widgets acquired by the designer, the designer has a net material cost of approximately −$61 per widget ($100−($3,226÷20)=−$61). Thus, the designer's net material cost has decreased by approximately $161 per widget over the net material cost at the target division.

In a fourth deviation example the manufacturer retains 90 manufactured widgets for resale, leaving the designer with 10 manufactured widgets. The manufacturer makes a royalty payment to the designer that is approximately $3,066 for the retained widgets (90 widgets×($100×34.07%)=$3,066). Further, the manufacturer makes a penalty royalty payment to the designer that is approximately $1,800 for the number of retained widgets that exceeds the target ((90−54)×($100×50%)=$1,800). When the designer acquires the 10 manufactured widgets, the designer makes a mark-up payment to the manufacturer that is approximately $400 (10 widgets×($100×40%)=$400).

As the manufacturer makes payments totaling $4,866 to the designer and receives a mark-up payment of $400 from the designer, the manufacturer has a net outlay of approximately $4,466 ($4,866−$400=$4,466). When the $4,466 net outlay is spread over the 90 widgets retained, the manufacturer has a net material cost of approximately $150 per widget ($100+($4,466÷90)=$150). Thus, the manufacturer's net material cost has increased by approximately $50 per widget over the net material cost at the target division.

In contrast, the designer makes a mark-up payment of approximately $400 to the manufacturer and receives a royalty payment of approximately $4,866 from the manufacturer, resulting in a net benefit of approximately $4,466 for the designer. When the $4,466 benefit is spread over the 10 widgets acquired by the designer, the designer has a net material cost of approximately −$347 per widget ($100−($4,466÷10)=−$347). Thus, the manufacturer's net material cost has decreased by approximately $447 per widget over the net material cost at the target division.

Referring to FIG. 5 and the summary 500 of net material costs for each of the parties for the product splits described above, this analysis shows that as the manufacturer retains an increasing share 502 of widgets the manufacturer realizes a higher net material cost. In contrast, the designer realizes a decreasing net material cost and, therefore, is in a better position in the market relative to the manufacturer with regard to net material cost. With further reference to FIG. 3, a comparison of the summary 500 of the examples that include penalty fees to the summary 300 of the examples without penalty fees shows that the penalty fees provide additional incentive in the form of a more rapid increase in net material cost for the party retaining more than their allocated share of widgets. These deviations in net material cost, in the absence of other factors, tend to cause corrective behavior of the parties by incentivizing the manufacturer to return to the target division of products with a resultant decrease in net material cost.

The third scenario is one in which the designer exceeds the designer's share of manufactured products under the target division. Several example deviations are presented under this scenario in order to show the progressive increase in the net material cost as the designers share continues to increase over the target share.

In a first deviation example the manufacturer retains 50 manufactured widgets for resale, leaving the designer with 50 manufactured widgets. The manufacturer makes a royalty payment to the designer that is approximately $1,704 for the retained widgets (50 widgets×($100×34.07%)=$1,704). When the designer acquires the 50 manufactured widgets, the designer makes a mark-up payment to the manufacturer that is approximately $2,000 (50 widgets×($100×40%)=$2,000). Further, the designer makes a penalty mark-up payment to the manufacturer that is approximately $260 for the number of retained widgets that exceeds the target ((50−46)×($100×65%)=$260).

As the designer makes payments totaling $2,260 to the manufacturer and receives a royalty payment of $1,704 from the manufacturer, the designer has a net outlay of approximately $556 ($2,260−$1,704=$556). When the $556 net outlay is spread over the 50 widgets received, the designer has a net material cost of approximately $111 per widget ($100+($556÷50)=$111). Thus, the designer's net material cost has increased by approximately $11 per widget over the net material cost at the target division.

In contrast, the manufacturer makes a royalty payment of approximately $1,704 to the designer and receives a mark-up payment of approximately $2,260 from the designer, resulting in a net benefit of approximately $556 for the manufacturer. When the $556 benefit is spread over the 50 widgets retained by the manufacturer, the manufacturer has a net material cost of approximately $89 per widget ($100−($556÷50)=$89). Thus, the manufacturer's net material cost has decreased by approximately $11 per widget over the net material cost at the target division.

In a second deviation example the manufacturer retains 40 manufactured widgets, leaving 60 manufactured widgets available to the designer. The manufacturer makes a royalty payment to the designer that is approximately $1,363 for the retained widgets (40 widgets×($100×34.07%)=$1,363). When the designer acquires the 60 manufactured widgets, the designer makes a mark-up payment to the manufacturer that is approximately $2,400 (60 widgets×($100×40%)=$2,400). Further, the designer makes a penalty mark-up payment to the manufacturer that is approximately $910 for the number of retained widgets that exceeds the target ((60−46)×($100×65%)=$910).

As the designer makes payments totaling $3,310 to the manufacturer and receives a royalty payment of $1,363 from the manufacturer, the designer has a net outlay of approximately $1,947 ($3,310−$1,363=$1,947). When the $1,947 net outlay is spread over the 60 widgets received, the designer has a net material cost of approximately $132 per widget ($100+($1,947÷60)=$132). Thus, the designer's net material cost has increased by approximately $32 per widget over the net material cost at the target division.

In contrast, the manufacturer makes a royalty payment of approximately $1,363 to the designer and receives a mark-up payment of approximately $3,310 from the designer, resulting in a net benefit of approximately $1,947 for the manufacturer. When the $1,947 benefit is spread over the 40 widgets retained by the manufacturer, the manufacturer has a net material cost of approximately $51 per widget ($100−($1,947÷40)=$51). Thus, the manufacturer's net material cost has decreased by approximately $49 per widget over the net material cost at the target division.

In a third deviation example the manufacturer retains 30 manufactured widgets, leaving 70 manufactured widgets available to the designer. The manufacturer makes a royalty payment to the designer that is approximately $1,022 for the retained widgets (30 widgets×($100×34.07%)=$1,022). When the designer acquires the 70 manufactured widgets, the designer makes a mark-up payment to the manufacturer that is approximately $2,800 (70 widgets×($100×40%)=$2,800). Further, the designer makes a penalty mark-up payment to the manufacturer that is approximately $1,560 for the number of retained widgets that exceeds the target ((70−46)×($100×65%)=$1,560).

As the designer makes payments totaling $4,360 to the manufacturer and receives a royalty payment of $1,022 from the manufacturer, the designer has a net outlay of approximately $3,338 ($4,360−$1,022=$3,338). When the $3,338 net outlay is spread over the 70 widgets received, the designer has a net material cost of approximately $148 per widget ($100+($3,338÷70)=$148). Thus, the designer's net material cost has increased by approximately $48 per widget over the net material cost at the target division.

In contrast, the manufacturer makes a royalty payment of approximately $1,022 to the designer and receives a mark-up payment of approximately $4,360 from the designer, resulting in a net benefit of approximately $3,338 for the manufacturer. When the $3,338 benefit is spread over the 30 widgets retained by the manufacturer, the manufacturer has a net material cost of approximately −$11 per widget ($100−($3,338÷30)=−$11). Thus, the manufacturer's net material cost has decreased by approximately $111 per widget over the net material cost at the target division.

In a fourth deviation example the manufacturer retains 20 manufactured widgets, leaving 80 manufactured widgets available to the designer. The manufacturer makes a royalty payment to the designer that is approximately $681 for the retained widgets (20 widgets×($100×34.07%)=$681). When the designer acquires the 80 manufactured widgets, the designer makes a mark-up payment to the manufacturer that is approximately $3,200 (80 widgets×($100×40%)=$3,200). Further, the designer makes a penalty mark-up payment to the manufacturer that is approximately $2,210 for the number of retained widgets that exceeds the target ((80−46)×($100×65%)=$2,210).

As the designer makes payments totaling $5,410 to the manufacturer and receives a royalty payment of $681 from the manufacturer, the designer has a net outlay of approximately $4,729 ($5,410−$681=$4,729). When the $4,729 net outlay is spread over the 80 widgets received, the designer has a net material cost of approximately $131 per widget ($100+($4,729÷80)=$159). Thus, the designer's net material cost has increased by approximately $59 per widget over the net material cost at the target division.

In contrast, the manufacturer makes a royalty payment of approximately $681 to the designer and receives a mark-up payment of approximately $5,410 from the designer, resulting in a net benefit of approximately $4,729 for the manufacturer. When the $4,729 benefit is spread over the 20 widgets retained by the manufacturer, the manufacturer has a net material cost of approximately −$136 per widget ($100−($4,729÷20)=−$136). Thus, the manufacturer's net material cost has decreased by approximately $236 per widget over the net material cost at the target division.

In a fifth deviation example the manufacturer retains 10 manufactured widgets, leaving 90 manufactured widgets available to the designer. The manufacturer makes a royalty payment to the designer that is approximately $341 for the retained widgets (10 widgets×($100×34.07%)=$341). When the designer acquires the 90 manufactured widgets, the designer makes a mark-up payment to the manufacturer that is approximately $3,600 (90 widgets×($100×40%)=$3,600). Further, the designer makes a penalty mark-up payment to the manufacturer that is approximately $2,860 for the number of retained widgets that exceeds the target ((90–46)×($100×65%)=$2,860).

As the designer makes payments totaling $6,460 to the manufacturer and receives a royalty payment of $341 from the manufacturer, the designer has a net outlay of approximately $6,119 ($6,460−$341=$6,119). When the $6,119 net outlay is spread over the 90 widgets received, the designer has a net material cost of approximately $168 per widget ($100+($6,119÷90)=$168). Thus, the designer's net material cost has increased by approximately $68 per widget over the net material cost at the target division.

In contrast, the manufacturer makes a royalty payment of approximately $341 to the designer and receives a mark-up payment of approximately $6,460 from the designer, resulting in a net benefit of approximately $6,119 for the manufacturer. When the $6,119 benefit is spread over the 10 widgets retained by the manufacturer, the manufacturer has a net material cost of approximately −$512 per widget ($100−($6,119÷10)=−$512). Thus, the manufacturer's net material cost has decreased by approximately $612 per widget over the net material cost at the target division.

Returning to FIG. 5 and the summary 500 of net material costs for each of the parties for the product splits described above, this analysis shows that as the designer retains an increasing share 504 of widgets the designer realizes a higher net material cost. In contrast, the manufacturer realizes a decreasing net material cost and, therefore, is in a better position in the market relative to the designer with regard to net material cost. With further reference to FIG. 3, a comparison of the summary 500 of the examples that include penalty fees to the summary 300 of the examples without penalty fees shows that the penalty fees provide additional incentive in the form of a more rapid increase in net material cost for the designer when retaining more than their allocated share of widgets. These deviations in net material cost, in the absence of other factors, tend to cause corrective behavior of the parties by incentivizing the designer to return to the target division of products with a resultant decrease in net material cost.

Note that the examples provided above have been simplified for presentation in order to clearly reveal the net balancing effect of the model. As simplified herein, the examples assume that the manufacturer's cost of products is calculated using only the products retained after the net of royalty and mark-up fees; therefore, the examples do not expressly include information of sales price and net margins. In order to determine net margins, the manufacturer would take into account the margin earned supplying material to the customer and the margin earned supplying to the licensor. Therefore, in consideration of net margins, and because the manufacturer is required to build all of the products, the manufacturer would likely apply the net of mark-up and royalty to all of the manufactured products.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the terms "herein," "hereunder," "above," "below," and terms of similar import, when used in this application, refer to this application as a whole and not to any particular portion of this application. When the word "or" is used in reference to a list of two or more items, that word covers all of the following interpretations of the word: any of the items in the list, all of the items in the list and any combination of the items in the list.

The above description of illustrated embodiments of the cost-based technology and manufacturing exchange is not intended to be exhaustive or to limit the cost-based technology and manufacturing exchange to the precise form disclosed. While specific embodiments of, and examples for, the cost-based technology and manufacturing exchange are described herein for illustrative purposes, various equivalent modifications are possible within the scope of the cost-based technology and manufacturing exchange, as those skilled in the relevant art will recognize. The teachings of the cost-based technology and manufacturing exchange provided herein can be applied to other technology transfer and/or business models, not only for the cost-based technology and manufacturing exchange described above.

The elements and acts of the various embodiments described above can be combined to provide further embodiments. These and other changes can be made to the cost-based technology and manufacturing exchange in light of the above detailed description.

In general, in the following claims, the terms used should not be construed to limit the cost-based technology and manufacturing exchange to the specific embodiments disclosed in the specification and the claims, but should be construed to include all technology transfer and business models that operate under the claims to provide IP transfers. Accordingly, the cost-based technology and manufacturing exchange is not limited by the disclosure, but instead the scope of the cost-based technology and manufacturing exchange is to be determined entirely by the claims.

While certain aspects of the cost-based technology and manufacturing exchange are presented below in certain claim forms, the inventors contemplate the various aspects of the cost-based technology and manufacturing exchange in any number of claim forms. Accordingly, the inventors reserve the right to add additional claims after filing the application to pursue such additional claim forms for other aspects of the cost-based technology and manufacturing exchange.

What we claim is:

1. A method for transferring intellectual property (IP) between competing parties, wherein the parties include a manufacturer of products and a licensor of the IP, comprising:

generating a license agreement between the parties that includes a royalty rate, a mark-up rate, and a target division of manufactured products that include the IP;

determining the royalty rate as a first percentage of a cost of a component material of the manufactured products using a computer system;

determining the mark-up rate as a second percentage of the cost of the component material of the manufactured products using the computer system;

selecting a target net material cost using the computer system, wherein the net material cost is on a per-unit basis;

determining the target division of the manufactured products as a split of the products between the parties that results in the target net material cost using the computer system; and dividing the manufactured products between the manufacturer and the licensor in accordance with the target division, wherein the target division includes a demand division based on demand for the manufactured products, target net material cost.

2. The method of claim 1, further comprising:
transferring royalty payments from the manufacturer to the licensor for each product retained by the manufacturer, wherein the royalty payments are determined using the royalty rate; and
transferring mark-up payments from the licensor to the manufacturer for each manufactured product received by the licensor, wherein the mark-up payments are determined using the mark-up rate.

3. The method of claim 1, wherein a party taking more products than allocated to the party under the target division would realize an increasing net material cost.

4. The method of claim 1, wherein a party taking fewer products than allocated to the party under the target division would realize a decreasing net material cost.

5. The method of claim 1, wherein the target division results in a net material cost that is approximately equal for each of the parties.

6. The method of claim 5, wherein the target division is determined so that a first ratio of a number of products allocated to the licensor to a number of products allocated to the manufacturer is approximately equal to a second ratio of the royalty rate to the mark-up rate.

7. The method of claim 1, wherein the net material cost is an average net material cost averaged across a number N of the manufactured products.

8. The method of claim 1, further comprising adding a penalty royalty to the royalty rate when a manufacturer of the products retains a number of products that exceeds a manufacturer's share of the target division.

9. The method of claim 8, wherein the penalty royalty is a third percentage of the cost of the component material of the products.

10. The method of claim 8, wherein the penalty royalty is charged for each of the retained products that exceeds the manufacturer's share of the target division.

11. The method of claim 8, wherein the penalty royalty is incrementally increasing in proportion to the number of products retained by the manufacturer.

12. The method of claim 1, further comprising adding a penalty mark-up to the mark-up rate when a licensor of the IP acquires a number of products that exceeds a licensor's share of the target division.

13. The method of claim 12, wherein the penalty mark-up is a fourth percentage of the cost of the component material of the products.

14. The method of claim 12, wherein the penalty mark-up is charged for each of the products that exceeds the licensor's share of the target division.

15. The method of claim 12, wherein the penalty mark-up is incrementally increasing in proportion to the number of products acquired by the licensor.

16. The method of claim 1, wherein the component material is at least one of silicon and a silicon wafer.

17. The method of claim 1, wherein the manufactured product is an integrated chip.

18. The method of claim 1, wherein the IP includes at least one of technology, patents, and trade secrets.

19. The method of claim 1, further comprising transferring the IP among the parties under the license.

20. A method comprising:
identifying a product for manufacture and sale;
setting a royalty rate that is a first percentage of a cost of a component material of the product using a computer system;
setting a mark-up rate that is a second percentage of the cost of the component material using the computer system;
identifying a target split of at least one production group of the product that results in a target net material cost using the computer system, wherein the target split includes a first number of the products retained by a first party and a second number of the products for delivery to a second party; and
generating, using the computer system, an agreement between the first party and the second party under which the first party manufactures and sells the product in accordance with the royalty rate and the target split and the second party sells the product in accordance with the mark-up rate and the target split.

21. The method of claim 20, wherein the first party pays the royalty rate to the second party for each product produced by the first party, wherein the second party pays the mark-up rate to the first party for each product acquired for resale from the first party.

22. The method of claim 20, wherein the target split results in a net material cost that is approximately equal for each of the parties and a party taking more products than allocated to the party under the target split would realize an increasing net material cost and a party taking fewer products than allocated to the party under the target division would realize a decreasing net material cost, wherein the net material cost is on a per-unit basis.

23. The method of claim 20, wherein the first party and the second party compete in a market for sales of the product.

24. A method for supplying products in a market, comprising:
transferring technology of the products between parties including a licensor and a licensee;
establishing a royalty rate that is a first percentage of a cost of a component material of the products and establishing a mark-up rate that is a second percentage of the cost of the component material using a computer system;
identifying a target division of manufactured products that results in a selected target net material cost using the computer system, wherein the net material cost is on a per-unit basis;
manufacturing the products using the transferred technology and transferring royalty payments from the licensee to the licensor, wherein the royalty payments are determined using the royalty rate;
dividing the manufactured products between the licensor and the licensee in accordance with the target division and transferring mark-up payments from the licensor to the licensee for each manufactured product received by the licensor; and
supplying the products to customers in the market, wherein the products are available for purchase from the licensor and the licensee.

25. The method of claim 24, wherein a party taking more products than allocated to the party under the target division would realize an increasing net material cost and a party taking fewer products than allocated to the party under the target division would realize a decreasing net material cost.

26. The method of claim 24, wherein the target division results in a net material cost that is approximately equal for each of the parties.

27. The method of claim 24, further comprising adding a penalty royalty to the royalty rate when the licensee retains a number of products that exceeds a licensee's share of the target division.

28. The method of claim 27, wherein the penalty royalty is a third percentage of the cost of the component material of the products.

29. The method of claim 24, further comprising adding a penalty mark-up to the mark-up rate when the licensor acquires a number of products that exceeds a licensor's share of the target division.

30. The method of claim 29, wherein the penalty mark-up is a fourth percentage of the cost of the component material of the products.

31. The method of claim 24, wherein the transferred technology includes at least one of patents and trade secrets.

* * * * *